(12) United States Patent
Rohrer (10) Patent No.: US 9,983,463 B1
(45) Date of Patent: May 29, 2018

(54) VIDEO MOUTHPIECE APPARATUS AND METHOD OF MAKING SAME

(71) Applicant: Byron Rohrer, San Diego, CA (US)

(72) Inventor: Byron Rohrer, San Diego, CA (US)

(73) Assignee: Mission Beach Industries, LLC, San Diego, CA (US)

( * ) Notice: Subject to any disclaimer, the term of this patent is extended or adjusted under 35 U.S.C. 154(b) by 0 days. days.

(21) Appl. No.: 15/697,778

(22) Filed: Sep. 7, 2017

Related U.S. Application Data

(63) Continuation of application No. 14/698,700, filed on Apr. 28, 2015.

(60) Provisional application No. 61/985,461, filed on Apr. 29, 2014.

(51) Int. Cl.
*G03B 17/56* (2006.01)
*H04N 1/00* (2006.01)

(52) U.S. Cl.
CPC ....... *G03B 17/561* (2013.01); *H04N 1/00559* (2013.01)

(58) Field of Classification Search
CPC .......................... G03B 17/561; H04N 1/00559
See application file for complete search history.

(56) References Cited

U.S. PATENT DOCUMENTS

| | | | | |
|---|---|---|---|---|
| 2,651,981 A * | 9/1953 | Calhoun | ................ | F16M 13/04 206/820 |
| 4,853,722 A * | 8/1989 | Gell, Jr. | ................ | G03B 17/08 114/312 |
| 5,845,635 A * | 12/1998 | Hermansen | ........... | B63C 11/205 128/201.11 |
| 8,857,775 B1 * | 10/2014 | Clearman | ............ | G03B 17/561 24/334 |
| 2003/0148243 A1 * | 8/2003 | Kerschbaumer | ... | A61B 1/00041 433/29 |
| 2015/0076184 A1 * | 3/2015 | Achenbach | .......... | G03B 17/561 224/181 |
| 2015/0253651 A1 * | 9/2015 | Russell | ................ | G03B 17/561 224/181 |
| 2015/0316205 A1 * | 11/2015 | Bennett | .................. | F16M 13/04 224/181 |

OTHER PUBLICATIONS

Holmgren, Nick, DIY GoPro Mouth Mount, Mar. 14, 2013, http://www.nordicsurfersmag.se/article/diy_gopro_mouth_mount.*
Wang, Elliot, How to Make a Mouth Mount for GoPro, Jul. 5, 2013, https://www.youtube.com/watch?v=qwrdNSpm54k.*
Pascoe, Ben, DIY GoPro Mouth Mount, Mar. 3, 2013, http://www.learningsurfphotography.com/how-to-diy-gopro-mouth-mount/.*

* cited by examiner

*Primary Examiner* — Corey Skurdal
(74) *Attorney, Agent, or Firm* — Buche & Associates, P.C.; Bryce A. Johnson (57) ABSTRACT

A mount and method of manufacturing same is disclosed. The mount includes a mouthpiece for holding the mount in a user's mouth, a video connector piece for mounting a camera to the apparatus, and a connector that structurally secures the mouthpiece and the video connector piece. This provides for a near eye-level point of view while providing hands-free operation.

12 Claims, 7 Drawing Sheets

VIDEO MOUTHPIECE APPARATUS AND METHOD OF MAKING SAME

CROSS-REFERENCE TO RELATED APPLICATIONS

This application is a continuation of U.S. patent application Ser. No. 14/698,700 (filed Apr. 28, 2015); U.S. patent application Ser. No. 14/698,700 claims the benefit and priority of U.S. Prov. App. Ser. No. 61/985,461 (field Apr. 29, 2014); Both Applications are incorporated by reference in their entirety.

BACKGROUND OF THE INVENTION

Field of Invention

The invention is related to mechanisms for holding a device, for example a camera, and more specifically, to a hands-free device for holding a camera as close to eye level as possible.

Background

In general, recording devices—cameras—are hand held. During operation, the operator must use at least one hand to hold the camera. With an increase in Point-of-View (POV) action recording, operators of the camera are also performing the activity being recorded. This allows the viewer of the recording to see the activity from the participant's perspective. This presents the challenged of ensuring the participant in the activity does not hold the camera. Existing solution allow the operator/participant to mount the camera to the bike/helmet/board/car, etc. that is involved in the activity in a hands-free operation. However, when using these type of mounting devices, the activity is recorded from an un-natural perspective or POV. Additionally, many of the sports that require safety head gear, do not allow cameras to be mounted thereon. Cameras are not suited for a helmet camera mounted on the helmet due to the excessive movement caused by the weight of the camera, resulting in poor quality recordings. Additionally, there same problem exists for cameras that user a camera mount on the body.

The viewer's experience of a recording where the camera is mounted in an unnatural position, relative to the POV of the participant, is not the same as the POV of the participant in the activity. In some instances, the mounting location often results in poor recording due to excessive vibration associated with the mounting location. Therefore, what is needed is a system and method that allows the operator to mount the recording device or camera at POV that most closely resides at the participants eye level, thereby ensuring an approximation of a realistic POV.

SUMMARY OF THE DISCLOSURE

A system and method are disclosed in accordance with the various aspects of the invention that allow mounting of a recording device or camera as near eye level, thereby ensuring a realistic POV recording.

In accordance with the various aspects of the invention, a mount is secured to a camera and the mount is held in the participant's mouth while allowing the participant to breathe and perform the activity without interference in situations where a helmet or other mounting systems would not be practical. The device enables the participant—user—to video and photograph actions from the user's POV for later viewing.

In accordance with some aspects of the invention, the recording can be used for simulation of an activity for training.

In accordance with some aspects of the invention, the recording can later be analyzed and the information/analysis used training and coaching and educational purposes.

In accordance with some aspects of the invention, the recording can be used for entertainment or personal enjoyment.

In accordance with some aspects of the invention, the type of activities for this product includes but is not limited to: Surfing, Rock Climbing, Skydiving, Golf, Football, Basketball, Baseball, Kayaking, White water rafting, Stand up paddle-boarding, Aviation, or Horseback riding.

In accordance with some aspects of the invention, a mouth-mount for a video system, for example a device to secure an action camera between your teeth, enables user to breath and provides a near eye-level POV.

In accordance with some aspects of the invention, an orally fixed camera positioning/mounting device includes soft silicone and plastic mouthpiece to hold the camera hands free.

DETAILED DESCRIPTION

In accordance with the invention, it should be observed that the embodiments reside primarily in combinations of method step and apparatus components related to facilitating the invention. Accordingly the components and method steps have been represented where appropriate by conventional symbols in the drawing showing only those specific details that are pertinent to understanding the embodiments of the invention so as not to obscure the disclosure with details that will be readily apparent to those of ordinary skill in the art having the benefit of the description herein.

Unless defined otherwise, all terms used herein have the same meaning as commonly understood by one of ordinary skill in the art to which this invention belongs. Any methods and systems, similar or equivalent to those described herein, can also be used in the practice of the invention. Representative illustrative methods and embodiments of systems are also described in accordance with the aspects of the invention.

It is noted that, as used in this description, the singular forms "a," "an" and "the" include plural referents unless the context clearly dictates otherwise. Reference throughout this specification to "an aspect," "various aspects," "another aspect," "one embodiment," "an embodiment," "certain embodiment," or similar language means that a particular aspect, feature, structure, or characteristic described in connection with the embodiment is included in at least one embodiment of the invention. Thus, appearances of the phrases "in one embodiment," "in at least one embodiment," "in an embodiment," "in certain embodiments," and similar language throughout this specification may, but do not necessarily, all refer to the same embodiment.

The following detailed description is directed to certain sample embodiments. However, the disclosure can be embodied in a multitude of different ways as defined and covered by the claims. In this description, reference is made to the drawings wherein like parts are designated with like numerals throughout.

Referring now to FIGS. 1-8, in accordance with aspects of the invention, a holding apparatus or mount 10 is shown. In accordance with various aspects of the invention, the mount 10 includes a mouthpiece 12, which the user/operator of a camera 13 holds using their teeth.

Figure 1:
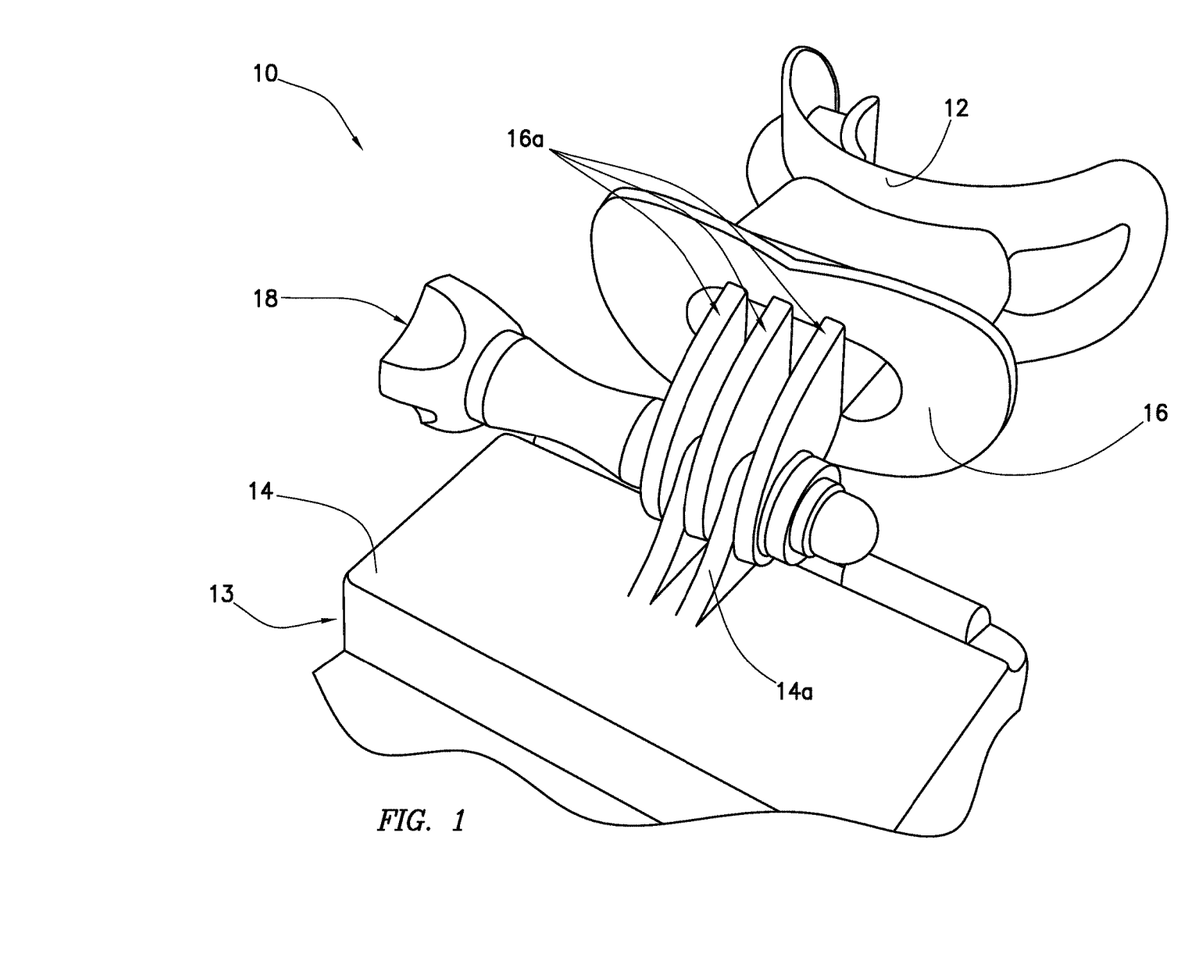
FIG. 1 illustrates an mount according to various aspects of the invention.
Figure 2:
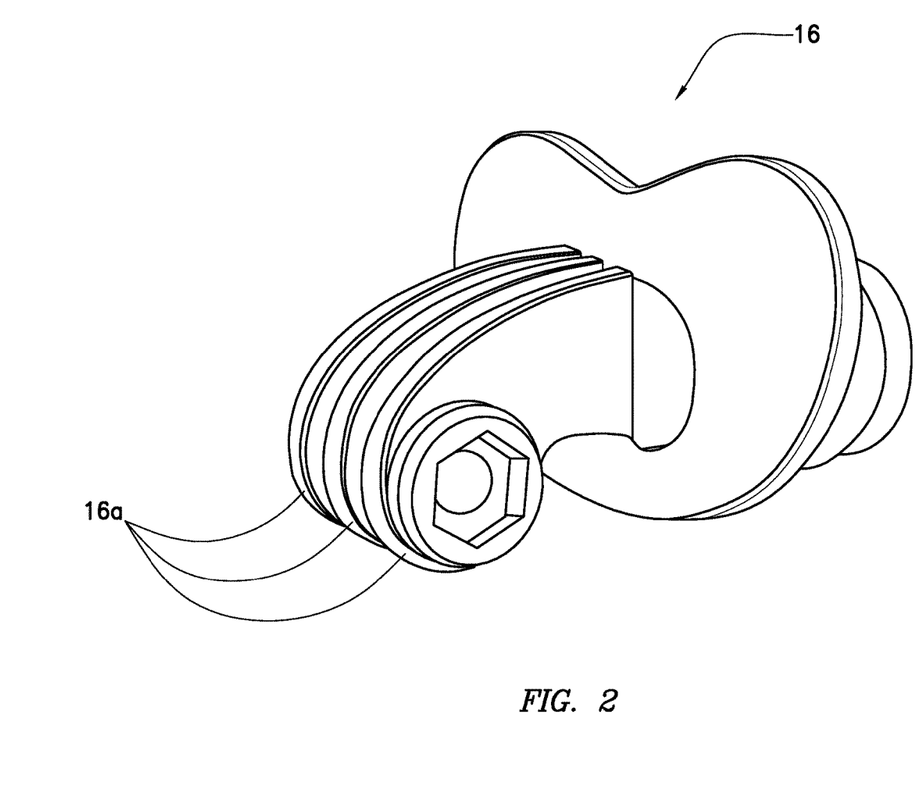
FIG. 2 illustrates a connector piece or unit according to various aspects of the invention.
Figure 3:
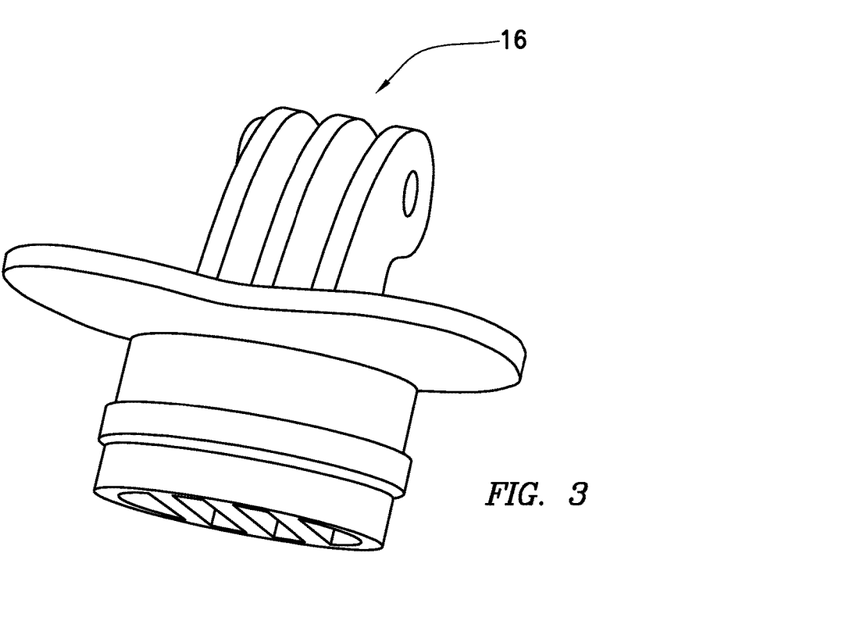
FIG. 3 illustrates various shapes and sizes of the connector piece or unit of FIG. 2 and one example of a bolt and nut system positioned through the unit, all of which are according to various aspects of the invention.
Figure 4:
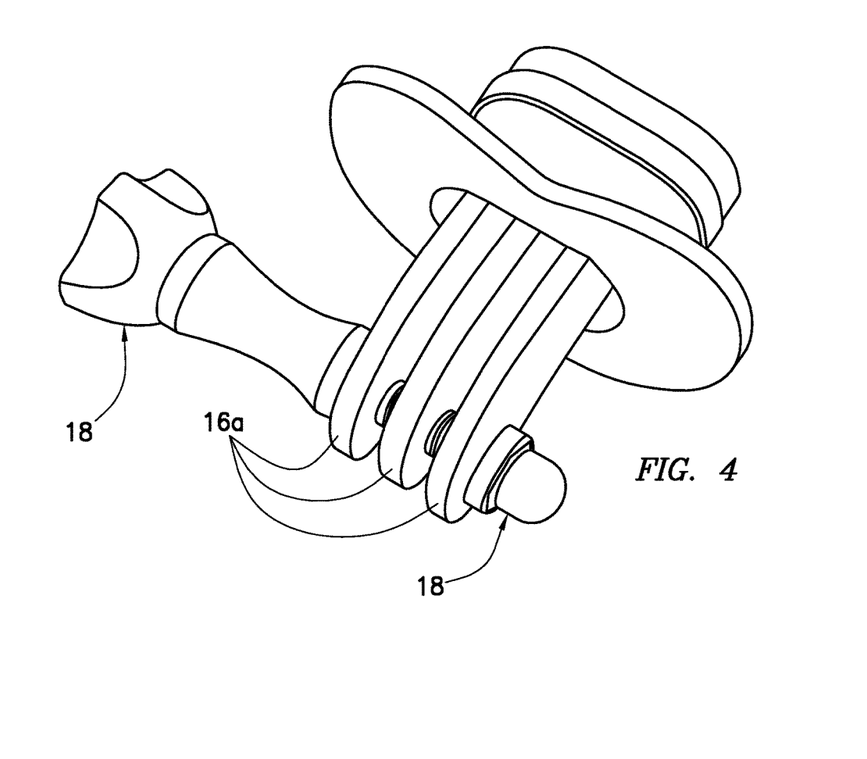
FIG. 4 is a multi-view of the unit of FIG. 2 according to various aspects of the invention.
Figure 5:
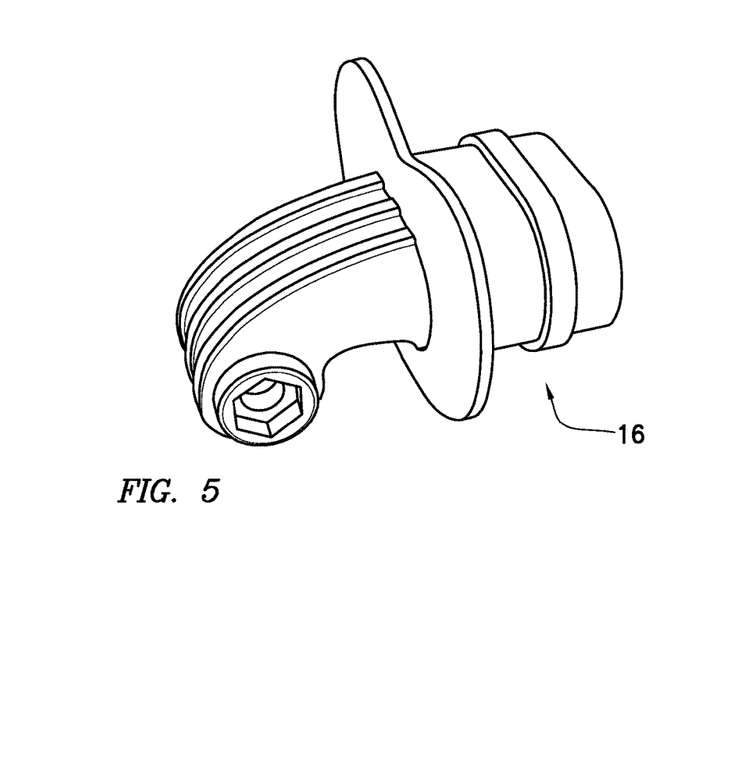
FIG. 5 is an enlarged perspective view of the unit of FIG. 2 according various aspects of the invention.
Figure 6:
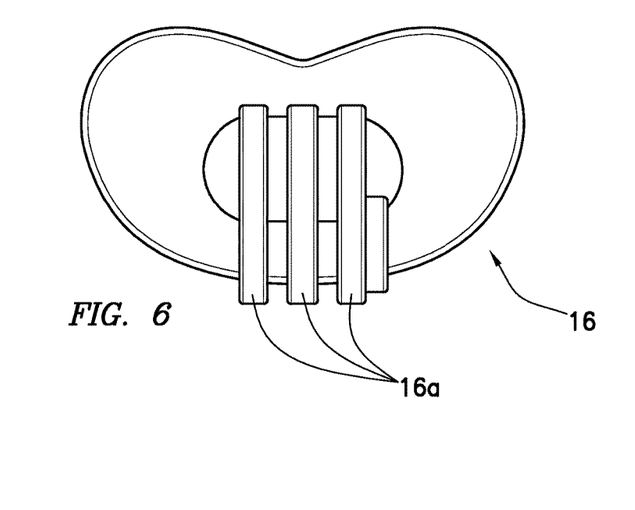
FIG. 6 is an enlarged front view of the unit of FIG. 2 according various aspects of the invention.
Figure 7:
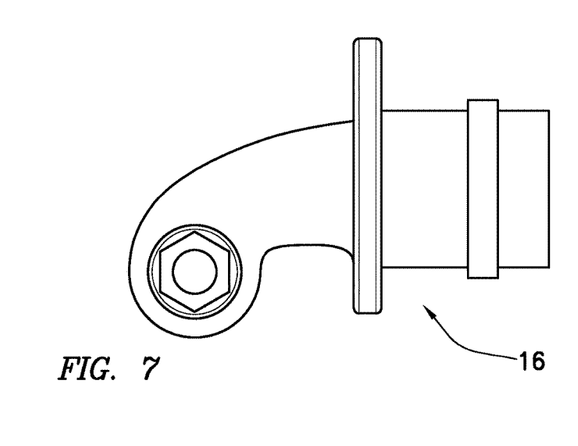
FIG. 7 is an enlarged right side view of the unit of FIG. 2 according various aspects of the invention.
Figure 8:
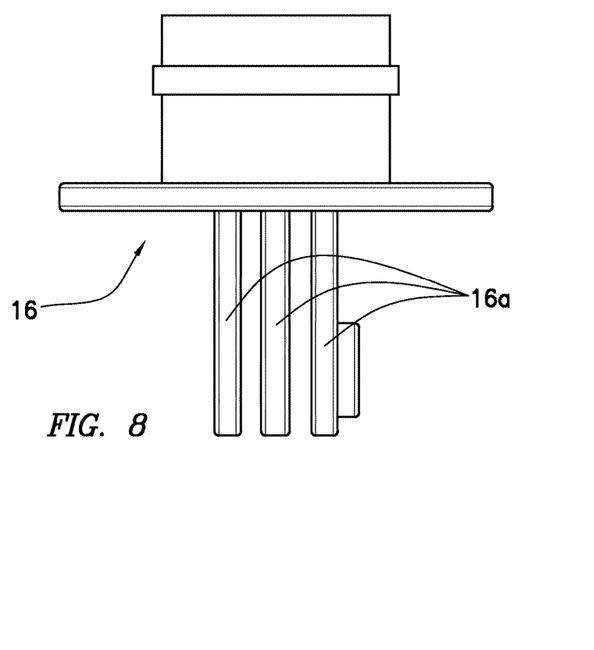
FIG. 8 is an enlarged top view of the unit of FIG. 2 according various aspects of the invention.

In accordance with various aspects of the invention, the camera 13 is attached or secured to a plastic device or piece 14 that includes a mating portion 14a. The mating portion 14a can be secured to a video connector piece or unit 16, which includes fingers 16a, using a bolt and nut system 18. In accordance with various aspects of the invention, the mating portion 14a defines mounting holes that are axially aligned with mounting holes defined by the fingers 16. Once the mounting holes of the mating portion 14a and the finger 16 are aligned, the bolt and nut system 18 is passed through the mounting holes—defined by the mating portion 14a and the fingers 16—and the camera 13 is secured to the mount 10 and held in a place.

In accordance with various aspects of the invention, the camera 13 includes the mating portion 14a and there is no need for the piece 14. In accordance with various aspects of the invention, the mating portion 14a is part of a case that holds the camera 13.

In accordance with various aspects of the invention, breathing holes are defined by the mouthpiece 12 on top of the mount 10. In accordance with various aspects of the invention, breathing holes are defined by the fingers through mouthpiece 12 to allow the user to easily breathe while holding, the camera 13 and mount 10 secured together as an assembly in the mouth.

In accordance with various aspects of the invention, the mount 10 includes a hard plastic insert incorporated in the mouthpiece's 12 silicone/rubber form to make the mount 10 strong enough to hold heavier cameras comfortably with the mouth, and allow breathing and hands-free operation so as not to interfere with the action at hand. In accordance with various aspects of the invention, the mouthpiece 12 is made of a combination of silicon and a hard plastic extension, such that the portion inserted in the mouth is soft and the portion outside of the mouth is a rigid or hard plastic and exposed.

The mount 10 includes the mouthpiece 12 that defines an opening for receiving the fingers 16. In accordance with various aspects of the invention, the mouthpiece 12 a silicone or any rubber product mouthpiece that is soft. The mouthpiece 12 is held between the teeth similar to a scuba diving mouthpiece, such as a snorkel or diving regulator mouthpiece or a safety mouth guard worn by boxers and football players. In accordance with various aspects of the invention, the mouthpiece's 12 shape can be formed to any shape that allows the user to bite down and securely hold the assembly that includes the mount 10 and camera 13. The mouthpiece 12 can be made of any of the following rubber products: Acrylic Rubber, Butyl Rubber, Chlorinated Polyethylene Epichlorhydrin, Ethylene Propylene Rubber, Hydrogenated Nitrile Rubber, Natural Rubber, Perfluoro Elastomers, Polynorbornene Rubber, Polyurethane Rubber, Styrene Butadiene Rubber, Butadiene Rubber, Chlorobutyl, Chlorosulphonated Polyethylene, Ethylene Acrylic, Fluoroelastomers, Isoprene Rubber, Nitrile Rubber, Polychloroprene, Polysulphide Rubber, Silicone (and Fluorosilicone) Rubber, Tetra-Flouroethylene/Propylene.

The mount 10 includes the unit 16 with fingers 16a that inserts into one end of the mouthpiece 12. In accordance with various aspects of the invention, the unit 16 includes a channel or an airway defined by and between the fingers 16a. In accordance with various aspects of the invention, a hole or an opening is defined in the top of the mount 10 through the mouthpiece 12 and the unit 16. The unit 16 can be of any shape that mating fits into the mouthpiece 12.

In accordance with various aspects of the invention, the unit 16 can be manufactured from any hard plastic material such as acrylics, polyesters, silicones, polyurethanes, and halogenated plastics, aluminum, wood, fiberglass or the combination of these listed materials.

In accordance with various aspects of the invention, the mouthpiece 12 and the unit 16 are secured together and the scope of the invention is not limited thereby. For example, securing the mouthpiece 12 and the unit 16 can be done using an adhesive approach (by gluing them together, securing them with Marine adhesive tape), a mechanical approach (by the use of wire or cable ties), a chemical bonding and/or heading approach, or the combination of all these processes.

Figure 9:
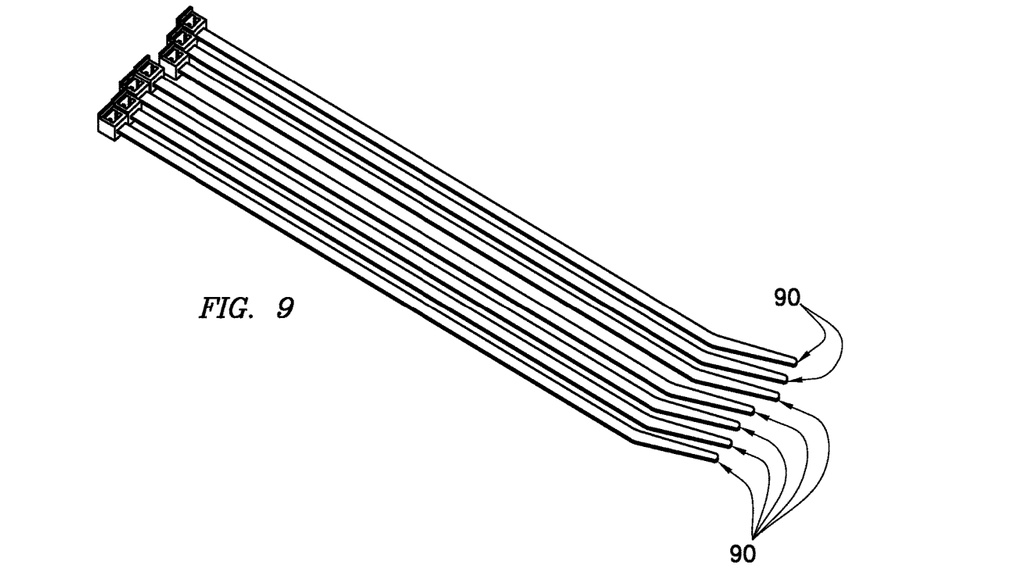
FIG. 9 illustrates a connector or connection means according to various aspects of the invention.
Figure 10:
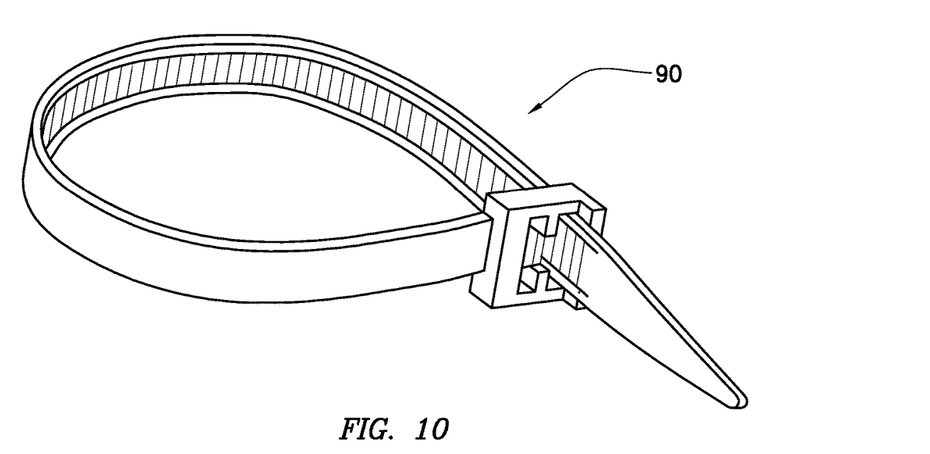
FIG. 10 is the connector of FIG. 9 according to various aspects of the invention.
Figure 11:
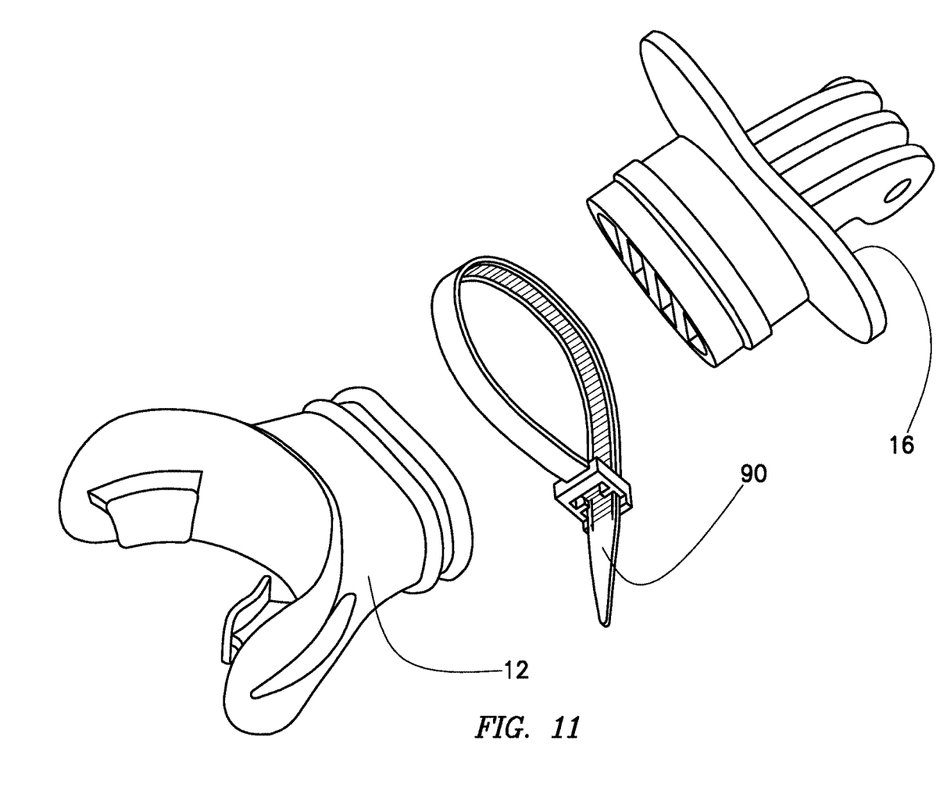
FIG. 11 is an assembling or manufacturing illustration according to various aspects of the invention.

Referring now to FIGS. 9-11, in accordance with various aspects of the invention, the mouthpiece 12 and the unit 16 are secured together using a connector, such as connector 90, multiple examples of which are shown in FIG. 9. The connector 90 can be any color and size and the scope of the invention is not limited thereby.

In accordance with various aspects of the invention, a tool is used for injection molding to manufacture the unit 16. In accordance with various aspects of the invention, the unit 16 can be produced using, for example, a 3D Printer. Carved or formed into a soft material such a plastic product, wood or clay. Colors of the unit 16 can be Black, White, Blue, Yellow, Green, Purple, Brown and can be made from any of the listed materials: as Acrylics, polyesters, silicones, polyurethanes, and halogenated plastics, aluminum, wood, fiberglass or the combination of these.

In accordance with various aspects of the invention, the mount 10 can be packaged to include the mount 10, a float that is secured to the camera 13 to stop the camera 13 from sinking during watersports, and a Lanyard to secure it to the user's body when the camera 13.

In accordance with various aspects of the invention, a telescope mount, which is similar to an expanding umbrella, is used in place of the mount 10. This allows the user to expand and/or extend the mount for a more pulled back perspective of their activity. In accordance with various aspects of the invention, this allows for a wider angle of their action being captured and a unique point of view.

In accordance with various aspects of the invention, the mount 10 can be incorporated into an existing breathing apparatus, such as SCUBA and snorkeling gear.

Those of ordinary skill in the art would understand that any combination of mouthpiece, mouth-guard, teeth-protector, etc., plus a video connection apparatus that facilitates connectable contact between the mouthpiece and a video unit, or any combination thereof, are within the scope of this application as defined by the features of the following claims. Likewise, any connection means to hold together the mouthpiece and the video connector piece, such as tape, tie-wrap, adhesive, heat fusion, etc., will work and are understood to be within the scope of this application. Also, any connection means to hold together the connector piece to the video device can be used, such as screws, clips, bolts, adhesive, etc., and are understood to be within the scope of this application. Finally, any manufacturing means and/or material can be used to make the products of this application and are considered to be within the scope of this disclosure.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added. Accordingly, the preceding merely illustrates the various aspects and principles as incorporated or captured in various embodiments of the invention. It will be appreciated that those of ordinary skill in the art will be able to devise various arrangements which, although not explicitly described or shown herein, embody the principles of the invention and are included within its spirit and scope.

Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure or material type.

All publications and patents cited in this specification are herein incorporated by reference as if each individual publication or patent were specifically and individually indicated to be incorporated by reference and are incorporated herein by reference to disclose and describe the methods and/or system in connection with which the publications are cited.

The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

Therefore, the scope of the invention, is not intended to be limited to the various aspects and embodiments discussed and described herein. Rather, the scope and spirit of invention is embodied by the appended claims.

I claim:

1. An apparatus comprising:
   a mouthpiece for holding the apparatus in a user's mouth;
   said mouthpiece being soft and featuring a hole defined therethrough;
   said mouthpiece connecting to a unit featuring three fingers that are hard;
   wherein said fingers each extend therethrough said hole so that the hole is divided into a plurality of centrally disposed airways by said fingers;
   and wherein said fingers are operationally configured to secure to a camera.

2. The apparatus of claim 1, wherein a connector for securing said mouthpiece and unit is a tie-wrap and the tie-wrap is positioned in a loop around the mouthpiece.

3. The apparatus of claim 2, wherein securing the mouthpiece and the unit forms a waterproof seal.

4. The apparatus of claim 3, wherein said plurality of centrally disposed airways facilitates breathing through the apparatus when the mouthpiece is inserted into the user's mouth.

5. The apparatus of claim 4, wherein each of said fingers define a side of said at least one airway selected from said centrally plurality of centrally disposed airways.

6. The apparatus of claim 5 further comprising a device that includes a mounting portion, wherein the mounting portion matingly secures to the unit.

7. The apparatus of claim 6, wherein the mounting portion includes a plurality of fingers that matingly align with the unit's fingers and wherein the mounting portion's fingers and the unit's fingers each define a mounting hole so that the mounting holes of the mounting portion's fingers axially align with the unit's fingers mounting holes.

8. The apparatus of claim 7, wherein the device is a camera and the mounting hole is a compatible with a said camera.

9. The apparatus of claim 8, wherein the mouthpiece is made of silicon and includes an insert incorporated into silicon.

10. The apparatus of claim 1, wherein a connector for securing said mouthpiece and unit is glue.

11. A method of manufacturing the apparatus of claim 2 comprising the steps of:
    inserting the unit into the hole of the mouthpiece;
    putting the tie-wrap in a loop;
    positioning the loop around the mouthpiece; and
    pulling the loop tightly around the mouthpiece so that the mouthpiece is squeezed around the unit to hold the mouthpiece and unit together.

12. The method of claim 11, wherein the unit is injection molded.

* * * * *